(12) United States Patent
Baiju et al.

(10) Patent No.: US 12,252,176 B2
(45) Date of Patent: Mar. 18, 2025

(54) VEHICLE BODY LATERAL SECTION STRUCTURE

(71) Applicant: HONDA MOTOR CO., LTD., Tokyo (JP)

(72) Inventors: Kodai Baiju, Wako (JP); Sho Ebata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 17/918,335

(22) PCT Filed: Dec. 25, 2020

(86) PCT No.: PCT/JP2020/048998
§ 371 (c)(1),
(2) Date: Oct. 12, 2022

(87) PCT Pub. No.: WO2021/215054
PCT Pub. Date: Oct. 28, 2021

(65) Prior Publication Data
US 2023/0140939 A1    May 11, 2023

(30) Foreign Application Priority Data
Apr. 23, 2020    (JP) ................................ 2020-076833

(51) Int. Cl.
*B62D 25/04*    (2006.01)
*B60R 13/08*    (2006.01)
(Continued)

(52) U.S. Cl.
CPC .......... *B62D 25/04* (2013.01); *B60R 13/0815* (2013.01); *B62D 25/02* (2013.01); *B62D 29/002* (2013.01); *B62D 25/025* (2013.01)

(58) Field of Classification Search
CPC ...... B62D 25/02; B62D 25/04; B62D 25/025; B62D 29/001; B62D 29/002; B60R 13/08; B60R 13/0807; B60R 13/0815
(Continued)

(56) References Cited

U.S. PATENT DOCUMENTS 10,625,786 B2 *  4/2020  Marukawa ........... B62D 25/025
2015/0130203 A1   5/2015  Sandoz et al.
(Continued)

FOREIGN PATENT DOCUMENTS

CN    105438268       3/2016
CN    107336747       11/2017
(Continued)

OTHER PUBLICATIONS

Japanese Office Action for Japanese Patent Application No. 2022-516845 dated Mar. 7, 2023.
(Continued)

*Primary Examiner* — Dennis H Pedder
(74) *Attorney, Agent, or Firm* — Amin, Turocy & Watson, LLP

(57) ABSTRACT

A vehicle body lateral section structure (10) is provided with a center pillar inner (41), a center pillar stiffener (42), a partitioning member (13), a filling material, a center pillar outer (43), and a sound insulation member (14). The center pillar stiffener forms a first closed cross-sectional portion (50) together with the center pillar inner. The partitioning member partitions a filling space (62) communicating with a first filling port and a second filling port inside the first closed cross-sectional portion. The center pillar outer forms a second closed cross-sectional portion (60) together with the center pillar stiffener. The sound insulation member is provided inside the second closed cross-sectional portion and foams when heated.

10 Claims, 11 Drawing Sheets

(51) Int. Cl.
*B62D 25/02* (2006.01)
*B62D 29/00* (2006.01)

(58) Field of Classification Search
USPC ......... 296/203.01–3, 193.05, 6, 209, 29, 30, 296/187.02
See application file for complete search history.

(56) References Cited

U.S. PATENT DOCUMENTS

| | | |
|---|---|---|
| 2016/0083015 A1 | 3/2016 | Kiyoshita et al. |
| 2016/0257344 A1 | 9/2016 | Hasegawa et al. |
| 2017/0313357 A1 | 11/2017 | Narahara et al. |
| 2018/0244323 A1 | 8/2018 | Vigil et al. |
| 2019/0009825 A1 | 1/2019 | Marukawa et al. |

FOREIGN PATENT DOCUMENTS

| | | |
|---|---|---|
| CN | 109204222 | 1/2019 |
| JP | 10-053156 | 2/1998 |
| JP | 2893624 | 5/1999 |
| JP | 2000-038157 | 2/2000 |
| JP | 2016-159813 | 9/2016 |
| JP | 2019-014326 | 1/2019 |
| JP | 6581623 | 9/2019 |

OTHER PUBLICATIONS

International Search Report and Written Opinion for International Application No. PCT/JP2020/048998 mailed on Mar. 23, 2021, 8 pages.
Chinese Office Action for Chinese Patent Application No. 202080099598.8 mailed Jan. 25, 2024.

* cited by examiner

VEHICLE BODY LATERAL SECTION STRUCTURE

TECHNICAL FIELD

The present invention relates to a vehicle body lateral section structure.

BACKGROUND ART

As a vehicle body lateral section structure, for example, a configuration in which a center pillar is raised from a side sill as a closed cross section, a partitioning member is locked inside the closed cross section to form a filling space, and the filling space is filled with a foamable filling material to block a space of the center pillar is known. The center pillar is a vehicle body frame member. By blocking a space of a center pillar with a filling material, it is possible to improve the soundproofing performance of a vehicle body (see, for example, Patent literature 1 (Japanese Patent No. 6581623)).

Further, as a configuration for blocking a space of a center pillar, a configuration in which a sound insulation member having an unfoamed member (a sound insulation material) attached to a plate is locked inside a closed cross section of the center pillar, and the unfoamed member foams in a filling space to block a space of the center pillar is known. By blocking the inside of a closed cross section of a center pillar with a sound insulation material, it is possible to improve the soundproofing performance of a vehicle body (see, for example, Patent literature 2 (Japanese Patent No. 2893624)).

SUMMARY OF INVENTION

Technical Problem

Here, a center pillar is a member that forms a vehicle body frame material and has, for example, a high-strength first closed cross section formed by an inner panel and a stiffener (a reinforcing panel) and a second closed cross section formed by the stiffener and a side outer panel which is an external design member.

Therefore, in order to improve the soundproofing performance of the center pillar, it is necessary to block all the closed cross sections of the first closed cross section and the second closed cross section, and it is desired to put this configuration into practical use.

An aspect of the present invention provides a vehicle body lateral section structure capable of blocking all the closed cross sections of a first closed cross section and a second closed cross section provided in a vehicle body frame material.

Solution to Problem

In order to solve the above problems, the present invention proposes the following means.
(1) According to an aspect of the present invention, there is provided a vehicle body lateral section structure including: an inner panel that has a filling port and an opening; a stiffener that is attached along the inner panel and forms a first closed cross-sectional portion together with the inner panel; a partitioning member that is provided inside the first closed cross-sectional portion through the opening and partitions a filling space communicating with the filling port inside the first closed cross-sectional portion; a foamable filling material that fills the filling space through the filling port; a side outer panel that covers the stiffener and forms a second closed cross-sectional portion together with the stiffener; and a sound insulation member that is provided inside the second closed cross-sectional portion and foams when heated.

According to the aspect of (1), the first closed cross-sectional portion is formed by the inner panel and the stiffener, and the partitioning member is provided inside the first closed cross-sectional portion through the opening of the inner panel. The filling space is formed inside the first closed cross-sectional portion by providing the partitioning member. The second closed cross-sectional portion is formed by the stiffener and the side outer panel. That is, a vehicle body frame material is formed by the inner panel, the stiffener, and the side outer panel, and the first closed cross-sectional portion and the second closed cross-sectional portion are formed in the vehicle body frame material.

Here, by the filling space of the first closed cross-sectional portion being filled with the foamable filling material through the filling port, the first closed cross-sectional portion is blocked with the filling material. The sound insulation member is provided inside the second closed cross-sectional portion, and the sound insulation member foams when heated in a drying furnace, for example, and thus the second closed cross-sectional portion is blocked with the sound insulation member.

In this way, by blocking the first closed cross-sectional portion and the second closed cross-sectional portion of the vehicle body lateral section structure with the filling material and the sound insulation member, respectively, it is possible to block all the closed cross sections of the vehicle body lateral section structure. As a result, the soundproofing performance of the vehicle body lateral section structure can be sufficiently (dramatically) improved.

(2) In the aspect of (1), the partitioning member may have a door portion that opens and closes to allow a fixing clip of the sound insulation member to pass.

Here, in order to adjust a filling amount of the filling material to fill the filling space, it is conceivable to form a recess in the partitioning member. For example, the sound insulation member may be fixed to the inside of the second closed cross-sectional portion in advance with the fixing clip before the partitioning member is attached to the inside of the first closed cross-sectional portion. In this case, it is conceivable that when the partitioning member is attached, the partitioning member interferes with, for example, the fixing clip of the sound insulation member that is fixed in advance.

That is, the side outer panel is attached to the stiffener in a state where the fixing clip is fitted into a fixing hole of the stiffener to fix the sound insulation member, and thus the stiffener and the side outer panel form a second closed cross-sectional portion. Therefore, the sound insulation member is fixed to the inside of the second closed cross-sectional portion. In this state, the partitioning member is provided inside the first closed cross-sectional portion through the opening. At this time, it is conceivable that the partitioning member interferes with the fixing clip.

According to the aspect of (2), the door portion is formed in the partitioning member such that the door portion is opened and closed to allow the fixing clip of the sound insulation member to pass. Therefore, the door portion can be opened when the second fixing clip passes and can be closed after the second fixing clip passes. As a result, the partitioning member can be assembled at a normal position, and further, the sealing property of the partitioning member after assembly can be ensured. Therefore, by the filling space of the first closed cross-sectional portion being filled with the foamable filling material through the filling port, the first closed cross-sectional portion can be reliably blocked with the filling material.

(3) In the aspect of (2), the door portion may be supported to be openable and closable with a door hinge made of a resin.

According to the aspect of (3), by forming the door hinge of the door portion with a resin, it is possible to support the door portion to be openable and closable with the door hinge having a simple configuration.

(4) In the aspect of any one of (1) to (3), the partitioning member may have a fixing knob portion provided inside the first closed cross-sectional portion and facing the opening.

According to the aspect of (4), when the operator disposes the partitioning member inside the first closed cross-sectional portion through the opening, for example, in order to allow the partitioning member to pass through the opening, it is conceivable to elastically deform the partitioning member into substantially a V shape in a side view. In this case, in a state where the partitioning member is disposed inside the first closed cross-sectional portion, the partitioning member is restored to a shape before bending, and the clip portion is inserted into the fixing hole that opens in the filling space and locked thereto.

At this time, it is conceivable that it is difficult for the operator to visually check the clip portion and the fixing hole. Also in this case, by operating the fixing knob portion through the opening, it is possible to easily lock the clip portion to the fixing hole. As a result, the operator can easily fix the partitioning member at a normal position in the first closed cross-sectional portion.

(5) In the aspect of any one of (1) to (4), the first closed cross-sectional portion may have a pair of inclined portions facing each other, and in the pair of inclined portions, a stiffener rear inclined portion may have a smaller inclination angle than a stiffener front inclined portion, the partitioning member may be divided into at least two portions via a bending hinge made of a resin and may have a first partitioning portion and a second partitioning portion that come into contact with the pair of inclined portions, and in the first partitioning portion and the second partitioning portion, the partitioning portion that comes into contact with the stiffener rear inclined portion may have a clip portion that is locked to a fixing hole that opens in the filling space.

According to the aspect of (5), the partitioning member is divided into at least two of the first partitioning portions and a second partitioning portion. Then, in the first partitioning portion and the second partitioning portion, the partitioning portion that comes into contact with the stiffener rear inclined portion having a small inclined angle has the clip portion formed therein. As a result, in a state where the partitioning portion provided with the clip portion is pressed with the filling that has filled the filling space, the partitioning portion is held at a normal position by the clip portion such that the partitioning portion does not open, and the filling material can be prevented from leaking to the outside of the filling space.

(6) In the aspect of any one of (1) to (5), the first closed cross-sectional portion may have a larger cross section than the second closed cross-sectional portion, and the filling space partitioned inside may be filled with a filling material which is a foaming material.

According to the aspect of (6), the first closed cross-sectional portion has a cross section (a cross-sectional area) larger than that of the second closed cross-sectional portion, and the filling space partitioned inside the first closed cross-sectional portion is filled with the filling material for a foaming material. As a result, by the filling space having a large cross section being filled with the filling material for a foaming material, the first closed cross-sectional portion can be easily and reliably blocked with the filling material, and the production property and the sound insulation property can be improved.

(7) In the aspect of (6), the second closed cross-sectional portion may be formed on a side opposite to the inner panel with respect to the first closed cross-sectional portion and may be blocked with the sound insulation member that foams when heated.

According to the aspect of (7), the second closed cross-sectional portion is formed on a side opposite to the inner panel with respect to the first closed cross section, and the sound insulation member that foams when heated blocks the second closed cross-sectional portion. Therefore, it is not necessary to fill the second closed cross-sectional portion with the filling material. Further, it is not necessary to form a filling port for filling the second closed cross-sectional portion with the filling material. As a result, the second closed cross-sectional portion can be easily and reliably blocked with the sound insulation member, and the production property and the sound insulation property can be improved.

(8) In the aspect of (5), at least one of the first partitioning portion and the second partitioning portion may have a horizontal portion, an inclined portion, and a raised portion straddling the horizontal portion and the inclined portion.

According to the aspect of (8), at least one of the first partitioning portion and the second partitioning portion has the horizontal portion, the inclined portion, and the raised portion. Further, the raised portion is formed to straddle the horizontal portion and the inclined portion. Therefore, the horizontal portion and the inclined portion can be reinforced by the raised portion. Therefore, when the filling space is filled with the foamable filling material, a posture of the first partitioning portion or the second partitioning portion can be held by the raised portion, and the filling amount of the foamable filling material can be adjusted.

(9) In the aspect of (5), in the first partitioning portion and the second partitioning portion, the partitioning portion that comes into contact with the stiffener rear inclined portion may have a holding knob portion for holding a posture at a position near the filling port and facing the opening in a state where the partitioning member is provided inside the first closed cross-sectional portion.

According to the aspect of (9), in the first partitioning portion and the second partitioning portion, the partitioning portion that comes into contact with the stiffener rear inclined portion having a small inclined angle has the holding knob portion for holding a posture at a position near the filling port and facing the opening. As a result, the operator can hold the partitioning portion in a normal posture by operating the holding knob portion for holding a posture through the opening such that the partitioning portion does not move upward when pressed with the foamable filling material that has filled through the filling port, for example.

(10) In the aspect of any one of (5) to (9), at least one of the first partitioning portion and the second partitioning portion may have a bottom rib that comes into contact with a wall portion which partitions an end portion of the first closed cross-sectional portion.

According to the aspect of (10), the bottom rib is formed in at least one of the first partitioning portion and the second partitioning portion. Further, the bottom rib is brought into contact with the wall portion which partitions the end portion of the first closed cross-sectional portion. As a result, the first partitioning portion and the second partitioning portion can be held (fixed) at a normal position with the bottom rib.

Advantageous Effects of Invention

According to the present invention, a first closed cross-sectional portion and a second closed cross-sectional portion of a vehicle body lateral section structure are blocked with a filling material and a sound insulation member, respectively. As a result, it is possible to block all the closed cross sections of a first closed cross section and a second closed cross section provided in a vehicle body frame material.

DESCRIPTION OF EMBODIMENTS

Figure 1:
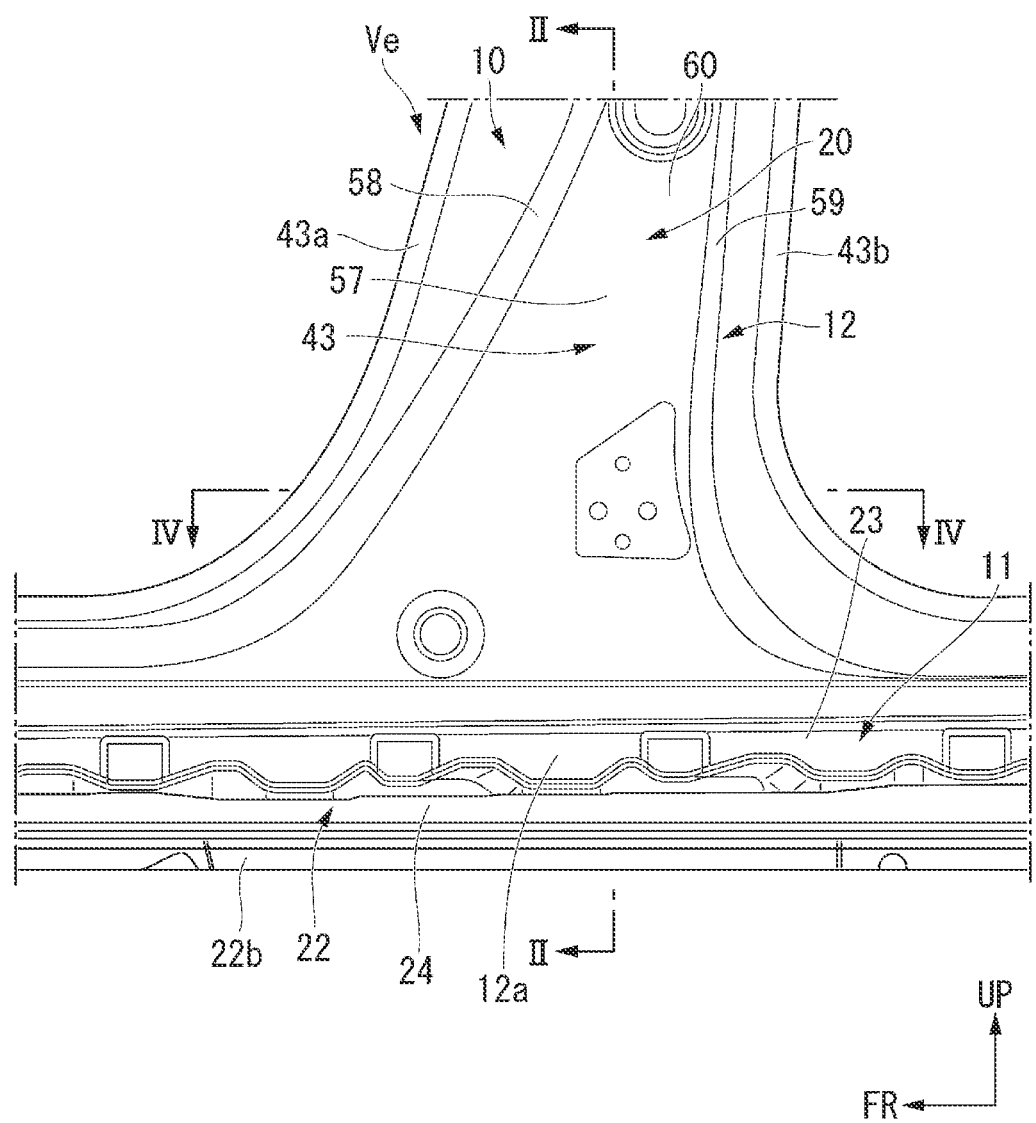
FIG. 1 is a side view of a vehicle body lateral section structure according to an embodiment of the present invention from the outside of a vehicle.
Figure 2:
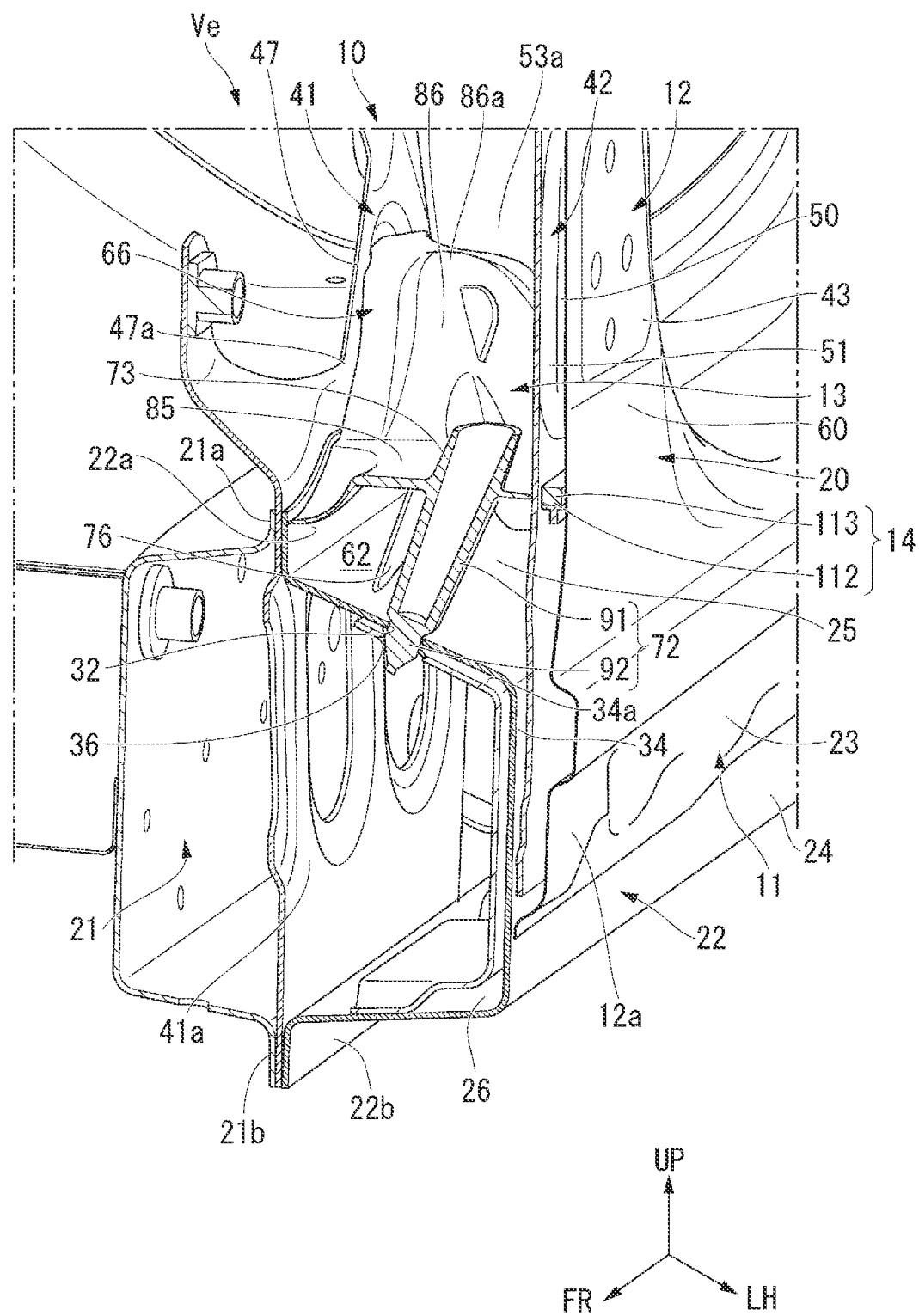
FIG. 2 is a cross-sectional view along line II-II of FIG. 1.

Hereinafter, a vehicle body lateral section structure according to an embodiment of the present invention will be described with reference to the drawings. In the drawings, an arrow FR indicates forward with respect to a vehicle, an arrow UP indicates upward with respect to the vehicle, and an arrow LH indicates leftward with respect to the vehicle.
<Vehicle>
As shown in FIGS. 1 and 2, the vehicle Ve includes, for example, a vehicle body lateral section structure 10, and the type and shape of the vehicle are not particularly limited. The vehicle body lateral section structure 10 is provided with a side sill 11 and a center pillar 12 as frame members. Hereinafter, a passenger car provided with the vehicle body lateral section structure 10 will be described as an example of the vehicle.
<Vehicle Body Lateral Section Structure>
The vehicle body lateral section structure 10 is a structure that forms vehicle body lateral sections on left and right sides of a vehicle body. The vehicle body lateral sections on the left and right sides of the vehicle body are configured to be substantially symmetrical. Therefore, hereinafter, the vehicle body lateral section on the left side of the vehicle body will be described as the vehicle body lateral section structure 10, and the description of the vehicle body lateral section on the right side of the vehicle body will be omitted.

The vehicle body lateral section structure 10 includes a side sill 11, a center pillar 12, a partitioning member 13, a filling material (not shown), and a sound insulation member 14.
<Side Sill>
The side sill 11 is a hollow frame member disposed on a left outer side in a vehicle width direction and extending in a front-rear direction of the vehicle body. The side sill 11 includes a side sill inner 21, a side sill stiffener (a reinforcing panel) 22, and a side sill outer 23.

The side sill inner 21 is formed in a hat shape in a cross section to bulge inward in the vehicle width direction. The side sill inner 21 has an inner upper flange 21a and an inner lower flange 21b. The side sill stiffener 22 is formed in a hat shape in a cross section to bulge outward in the vehicle width direction. The side sill stiffener 22 has a stiffener upper flange 22a and a stiffener lower flange 22b.

The inner upper flange 21a and the stiffener upper flange 22a are joined to each other in a state in which a lower portion 41a of a center pillar inner 41 (which will be described later) is sandwiched therebetween. The inner lower flange 21b and the stiffener lower flange 22b are joined to each other in a state in which the lower portion 41a of the center pillar inner 41 is sandwiched therebetween.

Figure 3:
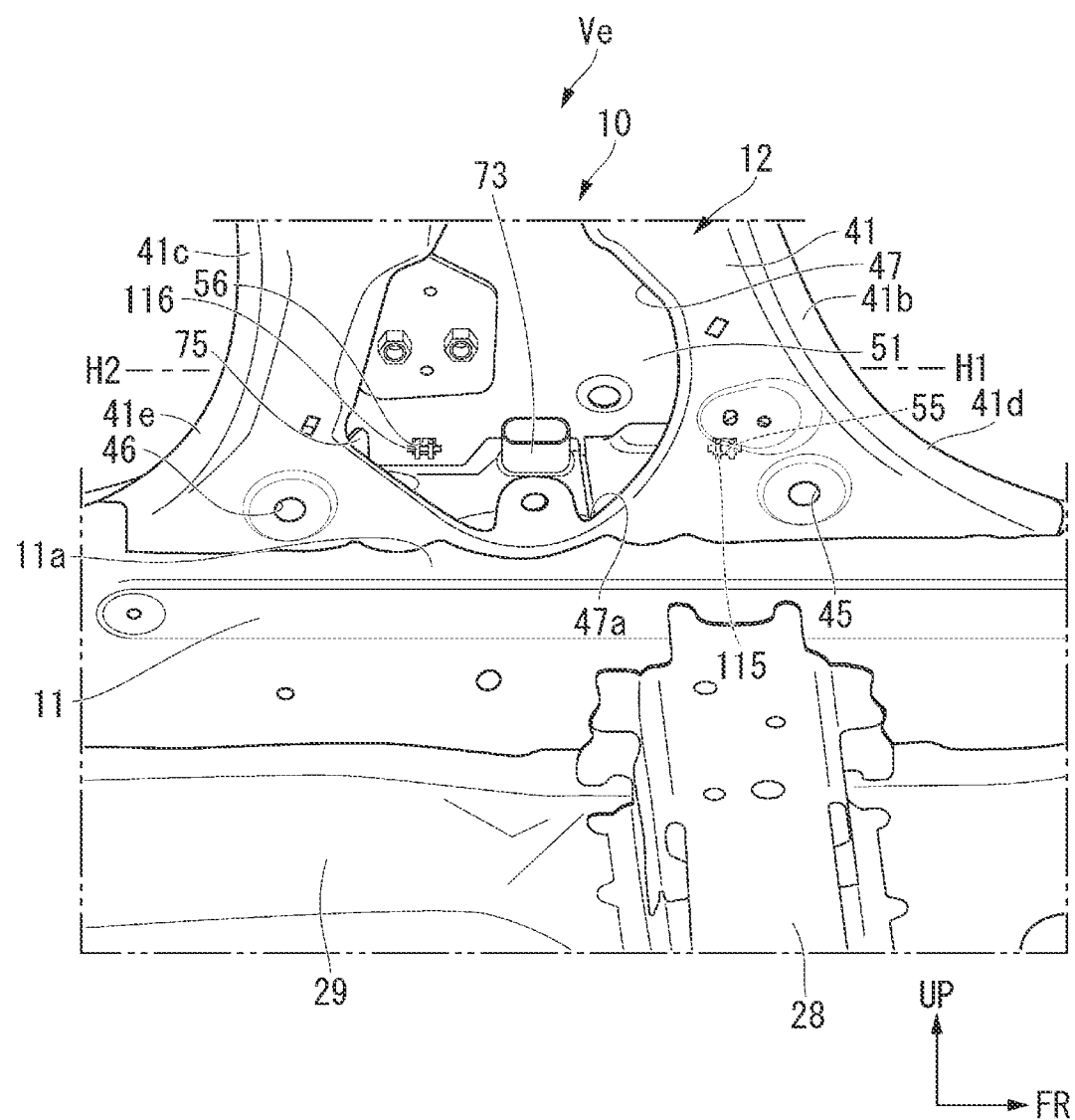
FIG. 3 is a side view of a vehicle body lateral section structure according to an embodiment of the present invention from the inside of a vehicle.

As a result, in the side sill 11, a closed cross-sectional portion (a closed cross section) having a rectangular frame shape is formed by the side sill inner 21 and the side sill stiffener 22. A cross member 28, a floor panel 29 (both are shown in FIG. 3), and the like are connected to an inner side of the side sill 11 in the vehicle width direction.

The side sill stiffener 22 includes a stiffener outer side surface portion 24, a stiffener upper surface portion 25 (a "wall portion partitioning an end portion of a first closed cross-sectional portion" in the claims) 25, and a stiffener lower surface portion 26 in addition to the stiffener upper flange 22a and the stiffener lower flange 22b.

The stiffener outer side surface portion 24 is vertically disposed on an outer side in the vehicle width direction and extends in the front-rear direction of the vehicle body.

The stiffener upper surface portion 25 extends in an upward inclined shape inward in the vehicle width direction from an upper side of the stiffener outer side surface portion 24 to a lower side of the stiffener upper flange 22a. The stiffener upper surface portion 25 has a first fixing hole (a fixing hole in the claims) 32 for fixing the partitioning member 13. The stiffener lower surface portion 26 extends in a downward inclined shape inward in the vehicle width direction from a lower side of the stiffener outer side surface portion 24 to an upper side of the stiffener lower flange 22b.

A reinforcing member 34 is attached to the inside of the side sill stiffener 22 along the stiffener outer side surface portion 24, the stiffener upper surface portion 25, and the stiffener lower surface portion 26. The reinforcing member 34 has a second fixing hole (a fixing hole in the claims) 36 formed in an upper surface portion 34a. The second fixing hole 36 is formed below the first fixing hole 32 and on a line extending from the first fixing hole 32. The first fixing hole 32 and the second fixing hole 36 open to a filling space 62 which will be described later.

A lower portion 51a of a stiffener external surface portion 51 (which will be described later) of the center pillar 12 is joined to the stiffener outer side surface portion 24. Further, the side sill outer 23 is joined to the stiffener outer side surface portion 24 from the outside in the vehicle width direction to cover the stiffener outer side surface portion 24. That is, the stiffener outer side surface portion 24, the stiffener upper surface portion 25, and the stiffener upper flange 22a are covered from the outside in the vehicle width direction with the side sill outer 23.

The side sill outer 23 is formed in a portion of the side outer panel 20 corresponding to the side sill stiffener 22. The side outer panel 20 is an external design member that forms an external surface of the vehicle body lateral section structure.

A lower end portion 12a of the center pillar 12 is joined to the center of the side sill 11 in the front-rear direction of the vehicle body.

<Center Pillar>

Figure 4:
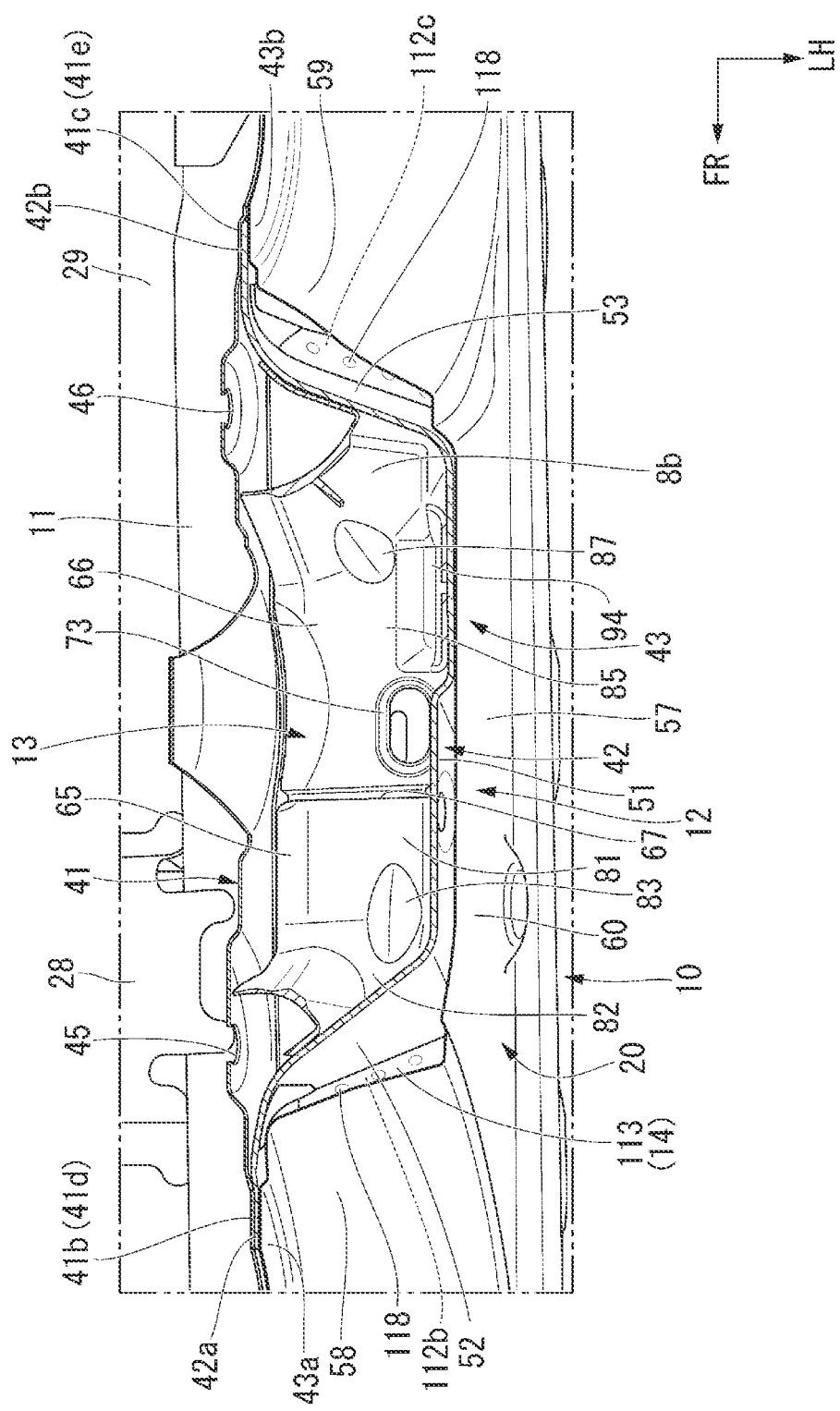
FIG. 4 is a cross-sectional view along line IV-IV of FIG. 1.
Figure 5:
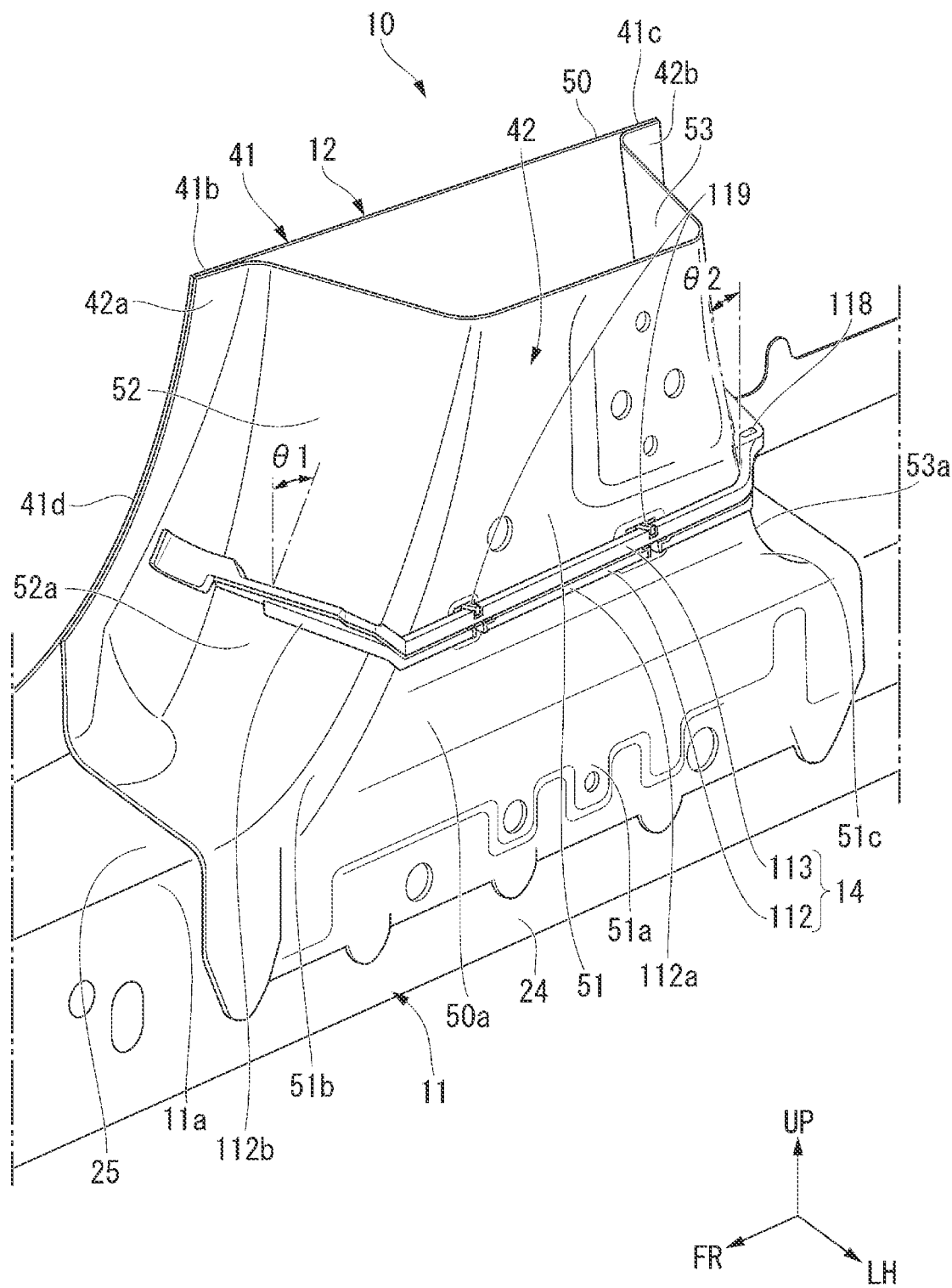
FIG. 5 is a perspective view with a side outer panel removed from the vehicle body lateral section structure of the embodiment.

As shown in FIGS. 3 to 5, the center pillar 12 includes a center pillar inner (an inner panel in the claims) 41, a center pillar stiffener (a stiffener or a reinforcing panel in the claims) 42, and a center pillar outer (a side outer panel in the claims) 43.

In the center pillar inner 41, for example, a flat plate member made of a metal such as high-strength steel is formed by press working. The center pillar inner 41 is disposed in the front-rear direction of the vehicle body in a state where the lower portion 41a (see FIG. 2) is sandwiched in the side sill 11 and is raised upward from the side sill 11. The center pillar inner 41 has a first filling port (a filling port in the claims) 45, a second filling port (a filling port in the claims) 46, an opening 47, an inner front flange 41b, and an inner rear flange 41c.

The inner front flange 41b forms a front side of the center pillar inner 41. The inner front flange 41b has an inner front inclined portion 41d. The inner front inclined portion 41d extends in an inclined shape upward from an upper portion 11a of the side sill 11 to a first position H1 having a predetermined height. The inner rear flange 41c forms a rear side of the center pillar inner 41. The inner rear flange 41c has an inner rear inclined portion 41e. The inner rear inclined portion 41e extends in an inclined shape upward from the upper portion 11a of the side sill 11 to a second position H2 having a predetermined height.

The first filling port 45 opens in the center pillar inner 41 between the inner front inclined portion 41d and the upper portion 11a of the side sill 11. The second filling port 46 opens in the center pillar inner 41 between the inner rear inclined portion 41e and the upper portion 11a of the side sill 11. The opening 47 opens in the center pillar inner 41 above the upper portion 11a of the side sill 11 between the inner front inclined portion 41d and the inner rear inclined portion 41e and between the first filling port 45 and the second filling port 46. For example, a retractor (a seatbelt component) of a seatbelt device (not shown) is arranged in the opening 47 in a state of being inserted. The retractor is a device that winds up and rewinds a webbing of the seatbelt device.

The center pillar stiffener 42 has a stiffener external surface portion 51, a stiffener front surface portion 52, a stiffener rear surface portion 53, a stiffener front flange 42a, and a stiffener rear flange 42b.

The stiffener external surface portion 51 has a lower portion 51a joined to the stiffener outer side surface portion 24 of the side sill 11 from the outside in the vehicle width direction and is raised upward from the stiffener outer side surface portion 24. The stiffener external surface portion 51 has a stiffener front inclined side 51b formed on a front side and a stiffener rear inclined side 51c formed on a rear side.

The stiffener front inclined side 51b extends in an inclined shape upward from an upper portion 11a of the side sill 11 to the first position H1 having a predetermined height. The stiffener front inclined side 51b extends in an inclined shape upward from an upper portion 11a of the side sill 11 to the second position H2 having a predetermined height.

The stiffener external surface portion 51 has a first attachment hole 55 formed in the vicinity of the stiffener front inclined side 51b and a second attachment hole 56 formed in the vicinity of the stiffener rear inclined side 51c. The sound insulation member 14, which will be described later, is attached to the first attachment hole 55 and the second attachment hole 56.

The stiffener front surface portion 52 is bent inward in the vehicle width direction from the front side of the stiffener external surface portion 51. The stiffener front surface portion 52 has a stiffener front inclined portion 52a. The stiffener front inclined portion 52a is bent inward in the vehicle width direction from the stiffener front inclined side 51b and extends in an inclined shape upward from the upper portion 11a of the side sill 11 to the first position H1 having a predetermined height. In the stiffener front inclined portion 52a, a front inclined angle (an inclined angle) of a portion with which the partitioning member 13, which will be described later, comes into contact is set to θ1 with respect to a vertical line.

The stiffener rear surface portion 53 is bent inward in the vehicle width direction from the rear side of the stiffener external surface portion 51. The stiffener rear surface portion 53 has a stiffener rear inclined portion 53a. The stiffener rear inclined portion 53a is bent inward in the vehicle width direction from the stiffener rear inclined side 51c. The stiffener rear inclined portion 53a extends in an inclined shape upward from the upper portion 11a of the side sill 11 to the second position H2 having a predetermined height. In the stiffener rear inclined portion 53a, a rear inclined angle (an inclined angle) of a portion with which the partitioning member 13, which will be described later, comes into contact is set to θ2 with respect to a vertical line.

The stiffener front inclined portion 52a and the stiffener rear inclined portion 53a form a pair of inclined portions disposed to face each other in the front-rear direction of the vehicle body. That is, the stiffener rear inclined portion 53a forms one of the pair of inclined portions. The stiffener front inclined portion 52a forms the other of the pair of inclined portions. The rear inclined angle θ2 of the stiffener rear inclined portion 53a is set smaller than the front inclined angle θ1 of the stiffener front inclined portion 52a.

The stiffener front flange 42a projects from an inner side of the stiffener front surface portion 52 toward the front of the vehicle body along the inner front flange 41b. The stiffener rear flange 42b projects from an inner side of the stiffener rear surface portion 53 toward the rear of the vehicle body along the inner rear flange 41c. The stiffener front flange 42a and the inner front flange 41b are joined to each other, and the stiffener rear flange 42b and the inner rear flange 41c are joined to each other.

Therefore, the center pillar stiffener 42 is attached along the center pillar inner 41. As a result, in the center pillar 12, a first closed cross-sectional portion (a first closed cross section) 50 having a rectangular frame shape is formed by the center pillar inner 41 and the center pillar stiffener 42. In the first closed cross-sectional portion 50, a lower end portion (an end portion) 50a is partitioned by the stiffener upper surface portion 25. That is, the stiffener upper surface portion 25 forms a wall portion that partitions the lower end portion 50a of the first closed cross-sectional portion 50.

As shown in FIGS. 1 and 4, the center pillar outer 43 has an outer external surface portion 57, an outer front surface portion 58, an outer rear surface portion 59, an outer front flange 43a, and an outer rear flange 43b.

The outer external surface portion 57 is raised from an upper side of the side sill outer 23 along the stiffener external surface portion 51. The outer external surface portion 57 is disposed with a gap outward in the vehicle width direction with respect to the stiffener external surface portion 51 (see also FIG. 2). The outer front surface portion 58 is bent inward in the vehicle width direction from a front side of the outer external surface portion 57 along the stiffener front surface portion 52. The outer front surface portion 58 is disposed with a gap on a side of the front of the vehicle body with respect to the stiffener front surface portion 52. The outer rear surface portion 59 is bent inward in the vehicle width direction from a rear side of the outer external surface portion 57 along the stiffener rear surface portion 53. The outer rear surface portion 59 is disposed with a gap on a side of the rear of the vehicle body with respect to the stiffener rear surface portion 53.

The outer front flange 43a projects from an inner side of the outer front surface portion 58 toward the front of the vehicle body along the stiffener front flange 42a. The outer rear flange 43b projects from an inner side of the outer rear surface portion 59 toward the rear of the vehicle body along the inner rear flange 41c. The outer front flange 43a is joined to the stiffener front flange 42a and the inner front flange 41b. The outer rear flange 43b is joined to the stiffener rear flange 42b and the inner rear flange 41c.

Therefore, the center pillar outer 43 is attached along the center pillar stiffener 42. That is, the center pillar stiffener 42 is covered from the outside in the vehicle width direction with the center pillar outer 43. The center pillar outer 43 is formed at a portion of the side outer panel 20 (that is, an external design member) corresponding to the center pillar stiffener 42.

As a result, in the center pillar 12, a second closed cross-sectional portion (a second closed cross section) 60 having a rectangular frame shape is formed by the center pillar stiffener 42 and the center pillar outer 43. The second closed cross-sectional portion 60 is formed on a side opposite to the center pillar inner 41 with respect to the first closed cross-sectional portion 50 in the vehicle width direction. The second closed cross-sectional portion 60 is formed in a cross section smaller than that of the first closed cross-sectional portion 50. In other words, the first closed cross-sectional portion 50 is formed in a cross section larger than that of the second closed cross-sectional portion 60.

<Partitioning Member>

Figure 6:
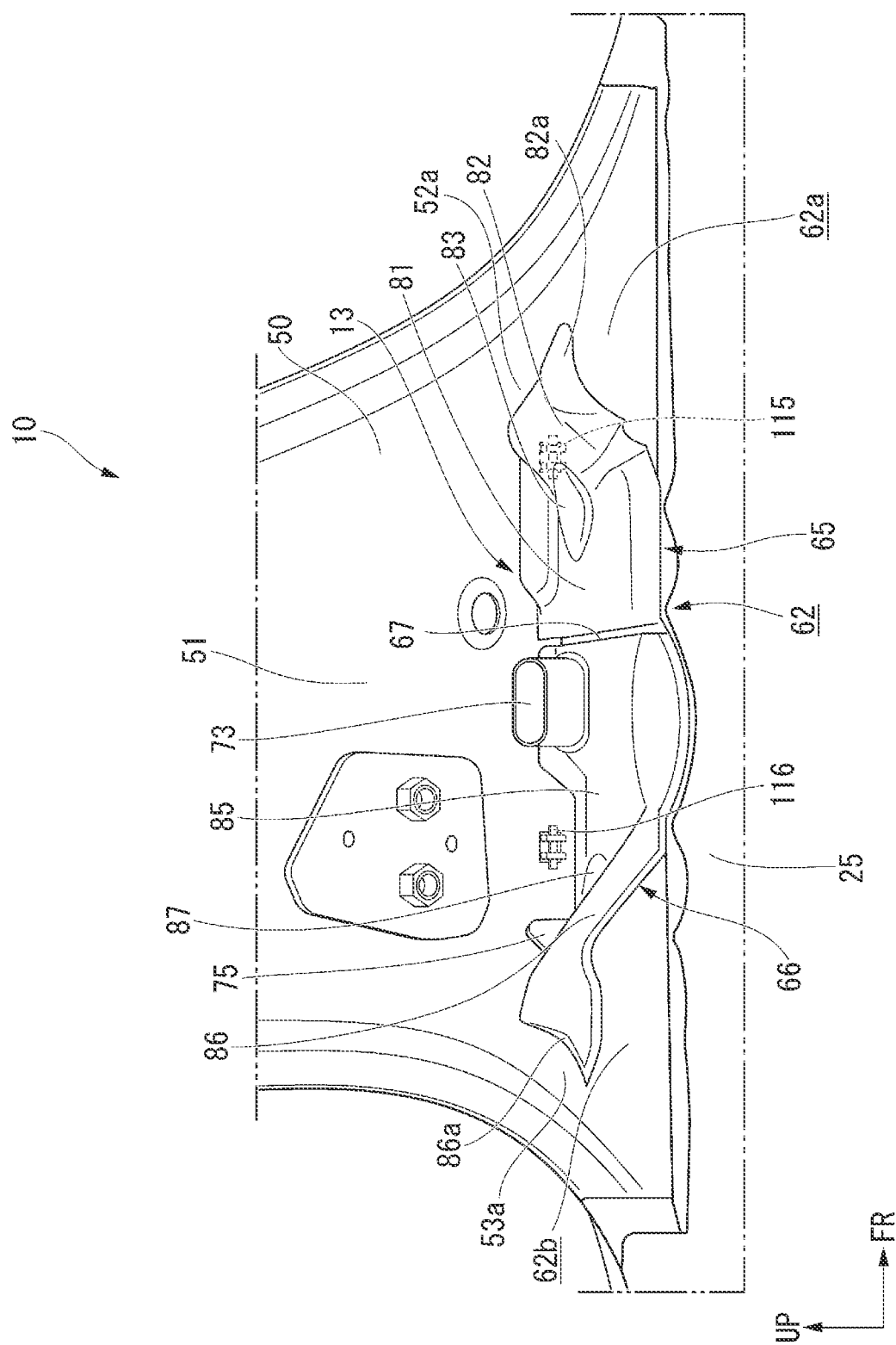
FIG. 6 is a perspective view with a center pillar inner removed from the vehicle body lateral section structure of FIG. 3.
Figure 7:
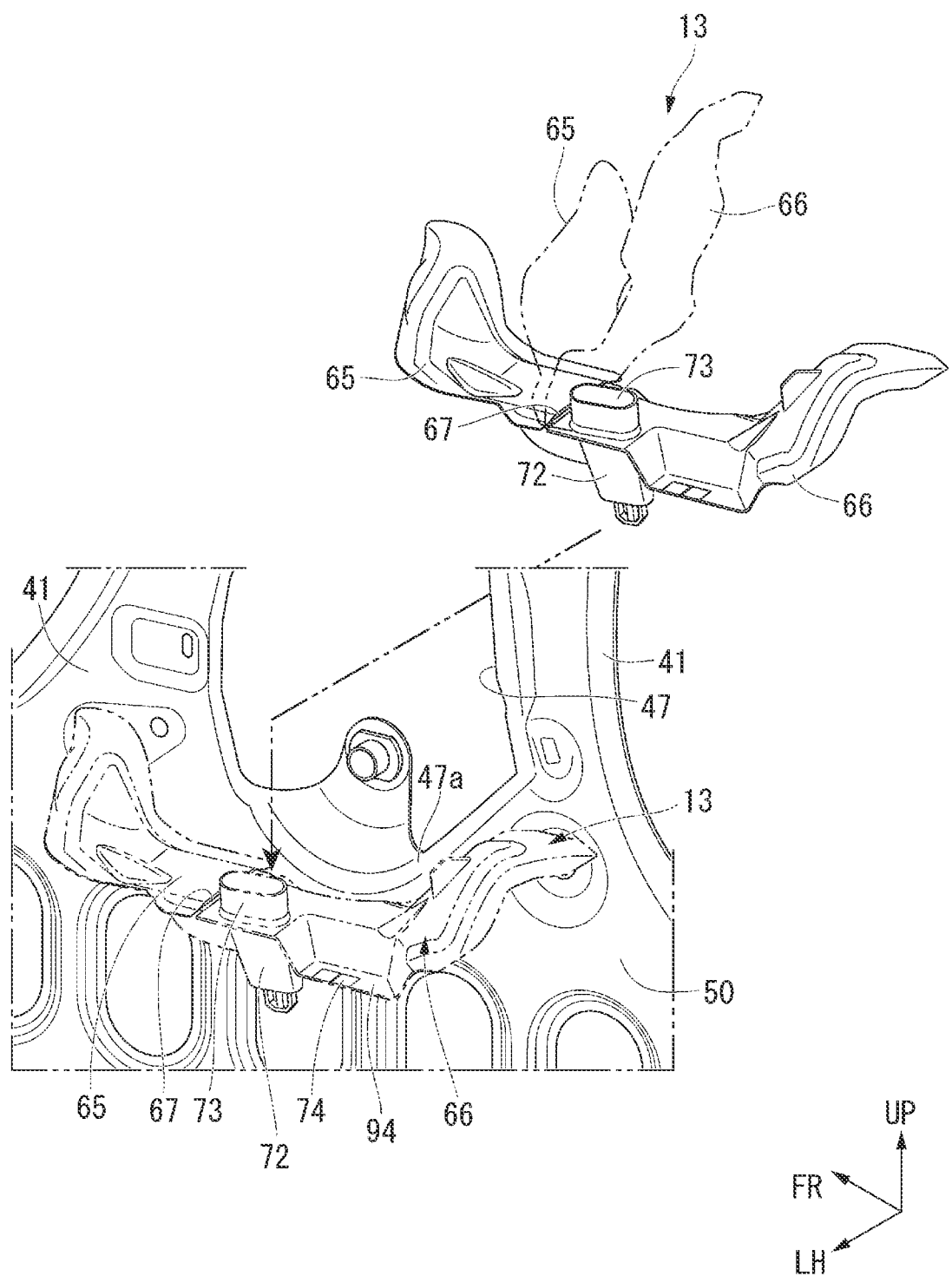
FIG. 7 is a perspective view showing a center pillar inner and a partitioning member according to the embodiment.
Figure 8:
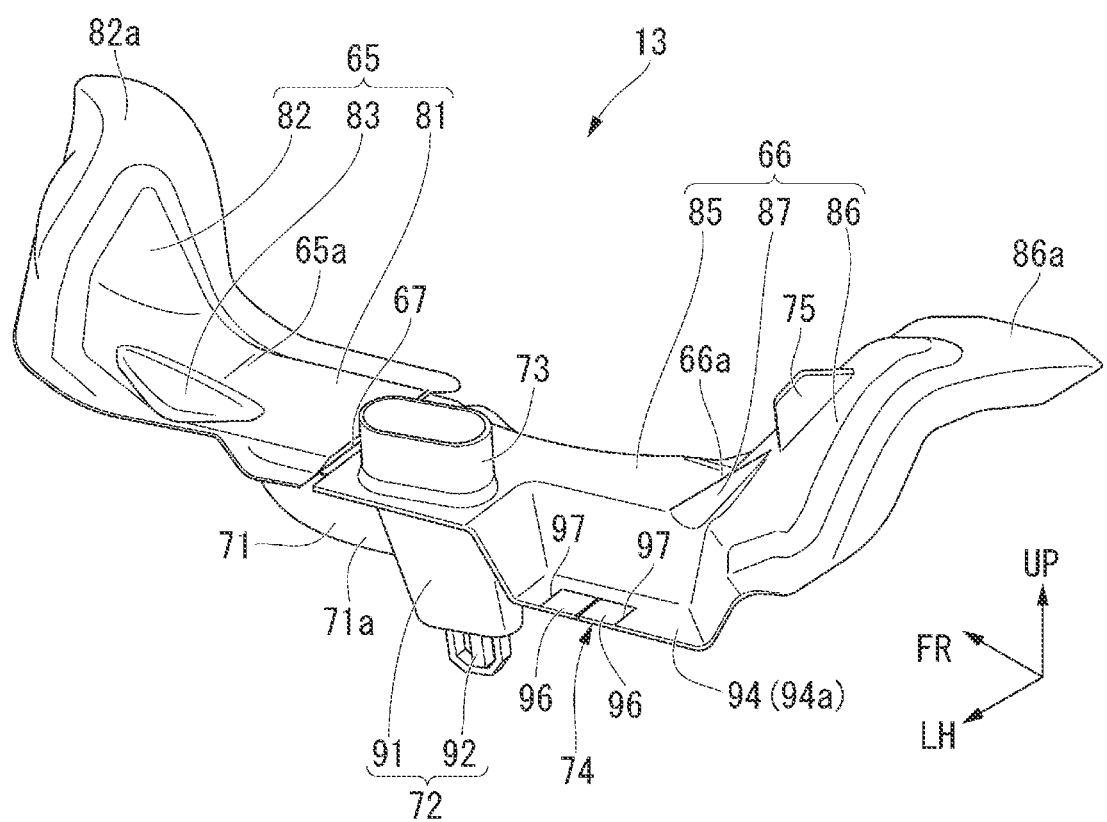
FIG. 8 is a perspective view showing the partitioning member of FIG. 7.

As shown in FIGS. 6 to 8, the partitioning member 13 is a member provided inside the first closed cross-sectional portion 50 from the opening 47. The partitioning member 13 is disposed below the lower end portion 47a of the opening 47 and above the stiffener upper surface portion 25 with a gap therebetween. Therefore, inside the first closed cross-sectional portion 50, a filling space 62 (see also FIG. 2) is partitioned by the stiffener upper surface portion 25 and the partitioning member 13 in a vertical direction. In the filling space 62, a front end portion 62a communicates with the first filling port 45 (see FIG. 3), and a rear end portion 62b communicates with the second filling port 46 (see FIG. 3). Therefore, the front end portion 62a of the filling space 62 communicates with the inside of the center pillar inner 41 in the vehicle width direction via the first filling port 45. The rear end portion 62b of the filling space 62 communicates with the inside of the center pillar inner 41 in the vehicle width direction via the second filling port 46. That is, the partitioning member 13 is disposed to partition a filling space 62 communicating with the first filling port 45 and the second filling port 46 inside the first closed cross-sectional portion 50.

The partitioning member 13 is a member formed of a resin and has a first partitioning portion 65 and a second partitioning portion 66 obtained by dividing the partitioning member 13 into two and a bending hinge 67 that connects the first partitioning portion 65 and the second partitioning portion 66 to each other. Further, the partitioning member 13 includes a first rib (a bottom rib in the claims) 71 in the first partitioning portion 65. In addition, the partitioning member 13 includes a clip portion 72, a fixing knob portion 73, a door portion 74, a holding knob portion 75, and a second rib (a bottom rib in the claims) 76 (see FIG. 2) in the second partitioning portion 66.

The first partitioning portion 65 is disposed on a side of the front of the vehicle body of the filling space 62. The second partitioning portion 66 is disposed on a side of the rear of the vehicle body of the filling space 62. The first partitioning portion 65 and the second partitioning portion 66 are foldably connected to each other by the bending hinge 67 made of a resin. The bending hinge 67 is formed to be thinner than a plate thickness of each of the first partitioning portion 65 and the second partitioning portion 66. Therefore, the bending hinge 67 is formed to be elastically deformable in a direction in which the first partitioning portion 65 and the second partitioning portion 66 are bent in the front-rear direction of the vehicle body.

The bending hinge 67 is formed close to a side of the front of the vehicle body with respect to the center of the partitioning member 13 in the front-rear direction of the vehicle body. By elastically deforming the bending hinge 67, it is possible to bend the first partitioning portion 65 and the second partitioning portion 66 into a V shape. As a result, the operator can easily pass the partitioning member 13 through the opening 47 and can easily dispose the partitioning member 13 inside the first closed cross-sectional portion 50 through the opening 47. In a state where the partitioning member 13 is disposed inside the first closed cross-sectional portion 50, the disposed partitioning member 13 can be restored to a shape before bending.

The first partitioning portion 65 has a first horizontal portion (a horizontal portion in the claims) 81, a first inclined portion (an inclined portion in the claims) 82, and a first raised portion (a raised portion in the claims) 83. The first horizontal portion 81 has a rear end portion connected to the bending hinge 67 and is disposed substantially horizontally with a gap upward with respect to the stiffener upper surface portion 25.

The first inclined portion 82 extends from a front end portion of the first horizontal portion 81 toward the front of the vehicle body and upward. In the first inclined portion 82, a front end portion (a tip end portion) 82a is bent substantially horizontally toward the front of the vehicle body. The front end portion 82a of the first inclined portion 82 is in contact with the stiffener front inclined portion 52a. The stiffener front inclined portion 52a is set as the front inclined angle θ1 (see FIG. 5) as described above.

The first raised portion 83 is formed on a front surface of the first horizontal portion 81 and a front surface of the first inclined portion 82 in the front-rear direction of the vehicle body to straddle the first horizontal portion 81 and the first inclined portion 82. That is, the first raised portion 83 is provided to straddle a first connecting recess 65a between the first horizontal portion 81 and the first inclined portion 82. Therefore, the first connecting recess 65a between the first horizontal portion 81 and the first inclined portion 82 is reinforced by the first raised portion 83.

The first rib 71 is provided on a back surface of the first partitioning portion 65. The first rib 71 protrudes downward. The first rib 71 is formed such that a lower end portion 71a is in contact with the stiffener upper surface portion 25 in a state where the partitioning member 13 is provided inside the first closed cross-sectional portion 50.

Figure 9:
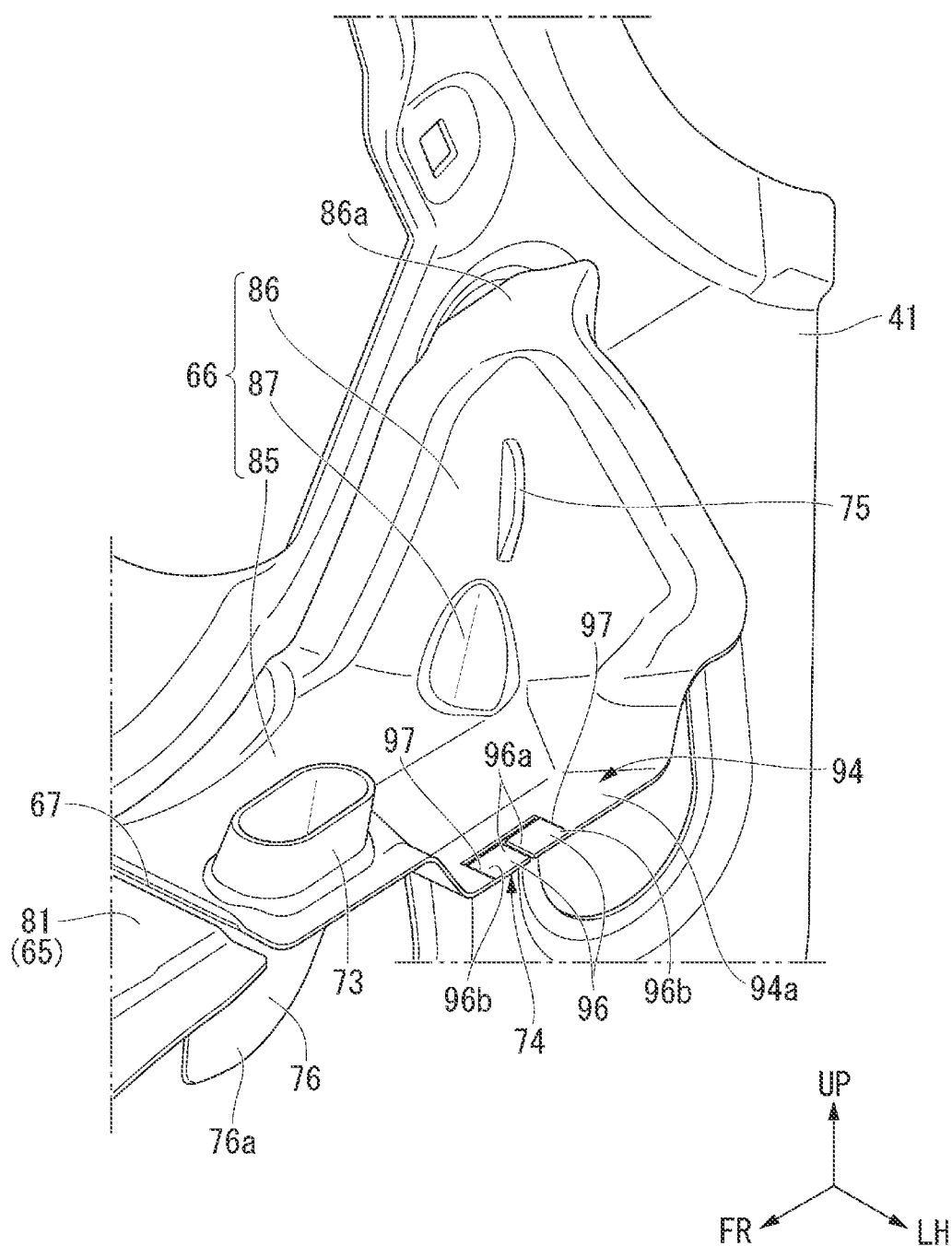
FIG. 9 is a perspective view showing a second partitioning portion of the partitioning member of the embodiment.
Figure 10:
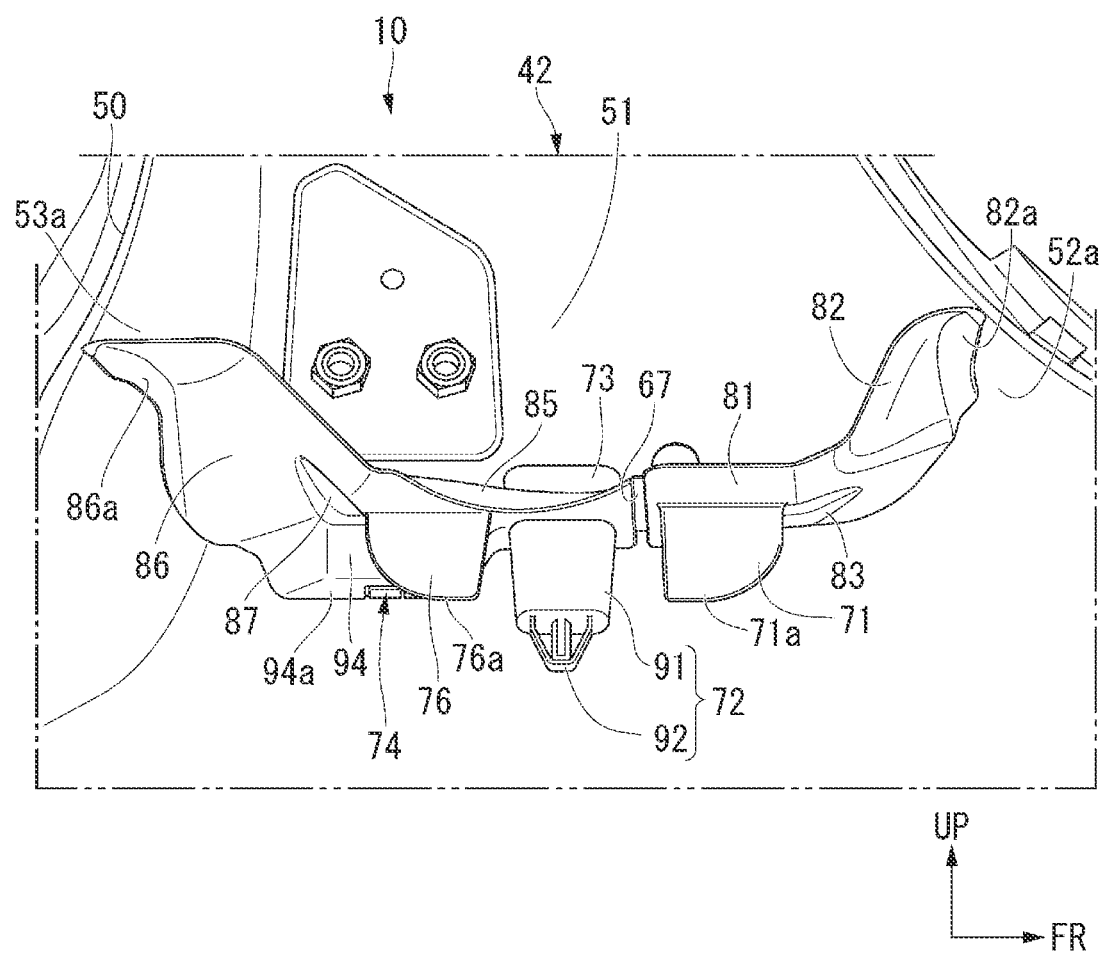
FIG. 10 is a perspective view showing a state in which the partitioning member of the embodiment is disposed inside a first closed cross-sectional portion.

As shown in FIGS. 8 to 10, the second partitioning portion 66 has a second horizontal portion 85 (a horizontal portion in the claims), a second inclined portion 86 (an inclined portion in the claims), and a second raised portion 87 (a raised portion in the claims). In the second horizontal portion 85, a front end portion is connected to the bending hinge 67. Similar to the first horizontal portion 81, the second horizontal portion 85 is disposed substantially horizontally with a gap upward with respect to the stiffener upper surface portion 25. A front surface of the second horizontal portion 85 is disposed substantially on the same surface as (to be flush with) the front surface of the first horizontal portion 81.

The second inclined portion 86 extends from a rear end portion of the second horizontal portion 85 toward the rear of the vehicle body and upward. A rear end portion (a tip end portion) 86a of the second inclined portion 86 is bent substantially horizontally toward the rear of the vehicle body. The rear end portion 86a of the second inclined portion 86 is in contact with the stiffener rear inclined portion 53a. The stiffener rear inclined portion 53a is set as the rear inclined angle θ2 (see FIG. 5) as described above. The rear inclined angle θ2 of the stiffener rear inclined portion 53a is set smaller than the front inclined angle θ1 (see FIG. 5) of the stiffener front inclined portion 52a.

The second raised portion 87 is formed on a front surface of the second horizontal portion 85 and a front surface of the second inclined portion 86 in the front-rear direction of the vehicle body to straddle the second horizontal portion 85 and the second inclined portion 86. That is, the second raised portion 87 is provided to straddle a second connecting recess 66a between the second horizontal portion 85 and the second inclined portion 86. Therefore, the second connecting recess 66a between the second horizontal portion 85 and the second inclined portion 86 is reinforced by the second raised portion 87.

In this way, the first connecting recess 65a between the first horizontal portion 81 and the first inclined portion 82 is reinforced by the first raised portion 83. The second connecting recess 66a between the second horizontal portion 85 and the second inclined portion 86 is reinforced by the second raised portion 87. Therefore, when the filling space 62 is filled with a filling material, a posture of the first partitioning portion 65 can be held by the first raised portion 83, and a posture of the second partitioning portion 66 can be held by the second raised portion 87. As a result, a filling amount of the filling material to fill the filling space 62 can be suitably adjusted using the posture of the partitioning member 13.

As shown in FIGS. 2, 8 and 10, the clip portion 72 is provided in a portion of the second horizontal portion 85 close to the bending hinge 67 (that is, the center of the partitioning member 13 in the front-rear direction of the vehicle body). The clip portion 72 has a protruding portion 91 and a partitioning clip 92.

The protruding portion 91 protrudes downward from the back surface of the second horizontal portion 85 to the stiffener upper surface portion 25 and in an inclined shape inward in the vehicle width direction. The partitioning clip 92 protrudes from a lower end portion of the protruding portion 91 to be insertable into the first fixing hole 32 of the stiffener upper surface portion 25 and the second fixing hole 36 of the reinforcing member 34. Further, the partitioning clip 92 is formed to be able to be locked (fixed) to each of the fixing holes 32 and 36 in a state of being inserted into the first fixing hole 32 and the second fixing hole 36.

Here, in the second partitioning portion 66, the rear end portion 86a of the second inclined portion 86 is in contact with the stiffener rear inclined portion 53a. The rear inclined angle θ2 (see FIG. 5) of the stiffener rear inclined portion 53a is set smaller than the front inclined angle θ1 of the stiffener front inclined portion 52a. Therefore, it is conceivable that the second partitioning portion 66 will open in a state where the second partitioning portion 66 is pressed with the filling material that has filled the filling space 62.

Therefore, the clip portion 72 is provided on the second horizontal portion 85 of the second partitioning portion 66. Therefore, the clip portion 72 (specifically, the partitioning clip 92) can hold the second partitioning portion 66 at a normal position such that the second partitioning portion 66 does not open upward. As a result, it is possible to prevent the filling material from leaking to the outside (above the outside) of the filling space 62.

The fixing knob portion 73 is formed on the front surface of the second horizontal portion 85 and on a line extending from the clip portion 72 (above the clip portion 72). The fixing knob portion 73 protrudes upward from the front surface of the second horizontal portion 85. The fixing knob portion 73 is disposed at a position facing the opening 47 (see FIG. 3) in a state where the partitioning member 13 is provided inside the first closed cross-sectional portion 50.

Here, it is considerable that when the partitioning clip 92 of the clip portion 72 is inserted into the first fixing hole 32 and the second fixing hole 36 and locked thereto, the operator is difficult to visually check the clip portion 72, the first fixing hole 32, and the second fixing hole 36. Also in this case, by operating the fixing knob portion 73 through the opening 47, it is possible to easily lock the partitioning clip 92 to the first fixing hole 32 and the second fixing hole 36.

In this way, the operator can easily fix the partitioning member 13 at a normal position in the first closed cross-sectional portion 50 by operating the fixing knob portion 73 through the opening 47.

As shown in FIGS. 8 and 9, a recess 94 is formed in a portion of the second horizontal portion 85 that is close to the second inclined portion 86 and close to the stiffener external surface portion 51 (see FIG. 4). The recess 94 is formed such that the front surface of the second horizontal portion 85 is recessed, and thus the recess 94 protrudes convexly into the filling space 62. As a result, a space of the filling space 62 can be adjusted with the recess 94, and the filling amount of the filling material to fill the filling space 62 can be suitably adjusted.

The door portion 74 is formed in a bottom portion 94a of the recess 94. The door portion 74 has a pair of flaps 96 and a pair of hinges (a door hinge in the claims) 97. The pair of flaps 96 are disposed flat along the bottom portion 94a of the recess 94 in a state where tip ends 96a and 96a are abutted against each other. In the pair of flaps 96, base ends 96b and 96b are supported by the bottom portion 94a of the recess 94 via the hinges 97 to be able to swing in the vertical direction.

The pair of hinges 97 are formed of a resin to be thin with respect to a plate thickness of the bottom portion 94a of the recess 94 or a plate thickness of each of the pair of flaps 96. Therefore, the pair of hinges 97 are formed to be elastically deformable to open and close the pair of flaps 96 in the vertical direction. By forming the pair of hinges 97 with a resin in this way, it is possible to support the door portion 74 to be openable and closable with the hinges 97 having a simple configuration.

By supporting the pair of flaps 96 with the pair of hinges 97, it is possible for the pair of hinges 97 to open and close the pair of flaps 96 such that a second fixing clip (a fixing clip in the claims) 116 of the sound insulation member 14, which will be described later, passes through the pair of flaps 96 in a state where the pair of flaps 96 are in contact with the second fixing clip 116.

As a result, the recess 94 can be formed in the second horizontal portion 85, and the filling amount of the filling material to fill the filling space 62 can be suitably adjusted.

As shown in FIGS. 6, 8 and 10, the holding knob portion 75 is formed on the front surface of the second inclined portion 86. The holding knob portion 75 protrudes from a portion of the front surface of the second inclined portion 86 on a side of the rear of the vehicle body from the second raised portion 87 and above the second raised portion 87 toward the front of the vehicle body and upward. The holding knob portion 75 is disposed at a position near the second filling port 46 and facing the opening 47 (both are shown in FIG. 3) in a state where the partitioning member 13 is provided inside the first closed cross-sectional portion 50.

Here, as described above, the second partitioning portion 66 is in contact with the stiffener rear inclined portion 53a having the small rear inclined angle θ2 (see FIG. 5). Therefore, for example, it is conceivable that the second partitioning portion 66 is moved upward by being pressed with the filling material that has filled through the second filling port 46.

Therefore, the holding knob portion 75 is disposed at a position near the second filling port 46 and facing the opening 47. As a result, the operator can hold the second partitioning portion 66 in a normal posture by operating the holding knob portion 75 through the opening 47 such that the second partitioning portion 66 does not move upward when pressed with the filling material that has filled through the second filling port 46, for example.

That is, the holding knob portion 75 is a posture holding knob used to hold the posture of the partitioning member 13 (specifically, the second partitioning portion 66).

The second rib 76 is provided on a back surface of the second partitioning portion 66. The second rib 76 protrudes downward. The second rib 76 is formed such that a lower end portion 76a is in contact with the stiffener upper surface portion 25 in a state where the partitioning member 13 is provided inside the first closed cross-sectional portion 50.

As described above, the first rib 71 is provided on the back surface of the first partitioning portion 65, and the second rib 76 is provided on the back surface of the second partitioning portion 66. Further, the first rib 71 and the second rib 76 are formed such that the lower end portions 71a and 76a are in contact with the stiffener upper surface portion 25. Therefore, the first partitioning portion 65 can be held at the normal position with the first rib 71, and the second partitioning portion 66 can be held at the normal position with the second rib 76. As a result, the partitioning member 13 can be held (fixed) at the normal position with the first rib 71 and the second rib 76.

<Filling Material>

The filling space 62 in which the inside of the first closed cross-sectional portion 50 is partitioned by the partitioning member 13 is filled with a foamable filling material through the first filling port 45 and the first filling port 45 (both, see FIG. 3).

As the filling material, for example, a structural foaming material is used. That is, in the filling material, as the structural foaming material, for example, so-called spray foam (also referred to as "spray rubber," "liquid rubber," or "liquid rubber") which becomes a rubber state when a liquid material at a room temperature dries is used. The filling material is, for example, fast-curing polyurethane foam that is contained in a spray can, is ejected in a foam state, and is cured in a sponge state. The solidified filling material has the functions of a soundproofing material, a vibration energy absorbing material, and an impact energy absorbing material.

When the filling material fills the filling space through the first filling port 45 and the first filling port 45, the filling space 62 is kept in a state sealed with the filling material.

<Sound Insulation Member>

As shown in FIGS. 3 to 5, the sound insulation member 14 is provided inside the second closed cross-sectional portion 60. The sound insulation member 14 includes a fixing member 112 and a sound insulation material 113. The fixing member 112 is formed of, for example, a synthetic resin material such as a hard ABS, polypropylene, polyvinyl chloride, and nylon, an aluminum alloy, a steel material, or the like. The fixing member 112 is formed in substantially a U shape in a plan view along the stiffener external surface portion 51, the stiffener front inclined portion 52a, and the stiffener rear inclined portion 53a of the center pillar stiffener 42.

The fixing member 112 includes a first fixing portion 112a, a second fixing portion 112b, and a third fixing portion 112c. The first fixing portion 112a is disposed along the stiffener external surface portion 51. The second fixing portion 112b is disposed along the stiffener front inclined portion 52a. The third fixing portion 112c is disposed along the stiffener rear inclined portion 53a. The first fixing portion 112a has a first fixing clip (a fixing clip in the claims) 115 and the second fixing clip (the fixing clip) 116.

The first fixing clip 115 protrudes inward in the vehicle width direction from a front portion of the first fixing portion 112a. The second fixing clip 116 protrudes inward in the vehicle width direction from a rear portion of the first fixing portion 112a. The first fixing clip 115 and the second fixing clip 116 are locked to the first attachment hole 55 and the second attachment hole 56 of the stiffener external surface portion 51, respectively, by being inserted into the attachment holes 55 and 56 from the outside in the vehicle width direction. Therefore, the first fixing portion 112a is attached (fixed) along the stiffener external surface portion 51 to be substantially horizontal in the front-rear direction of the vehicle body.

The second fixing portion 112b and the third fixing portion 112c are held along the stiffener front inclined portion 52a and the stiffener rear inclined portion 53a to be substantially horizontal in the vehicle width direction in a state of being placed on the stiffener front inclined portion 52a and the stiffener rear inclined portion 53a, respectively.

As a result, the fixing member 112 is disposed on a side opposite to the partitioning member 13 with respect to the stiffener external surface portion 51, the stiffener front inclined portion 52a, and the stiffener rear inclined portion 53a. Further, the fixing member 112 is disposed at substantially the same height as the first horizontal portion 81 and the second horizontal portion 85 of the partitioning member 13.

The sound insulation material 113 is held in the fixing member 112. The sound insulation material 113 is formed of, for example, a soft material such as polyurethane foam that foams when heated or polyethylene. The sound insulation material 113 is formed along an upper surface of the fixing member 112 and is formed in a substantially U shape in a plan view. The sound insulation material 113 is fixed to the fixing member 112 with a plurality of support pins 118 and a plurality of support hooks 119 in a state of being placed on the upper surface of the fixing member 112.

Therefore, the sound insulation member 14 is disposed on a side opposite to the partitioning member 13 with respect to the stiffener external surface portion 51 at substantially the same height as the first horizontal portion 81 and the second horizontal portion 85 of the partitioning member 13. In this state, the sound insulation member 14 is provided inside the second closed cross-sectional portion 60. The sound insulation member 14 is disposed along the outer external surface portion 57, the outer front surface portion 58, and the outer rear surface portion 59 of the center pillar outer 43 in a state of being in contact therewith (or being adjacent in a non-contact manner).

As a result, the sound insulation member 14 can block the inside of the second closed cross-sectional portion 60 by foaming when heated inside a drying furnace, for example.

Figure 11:
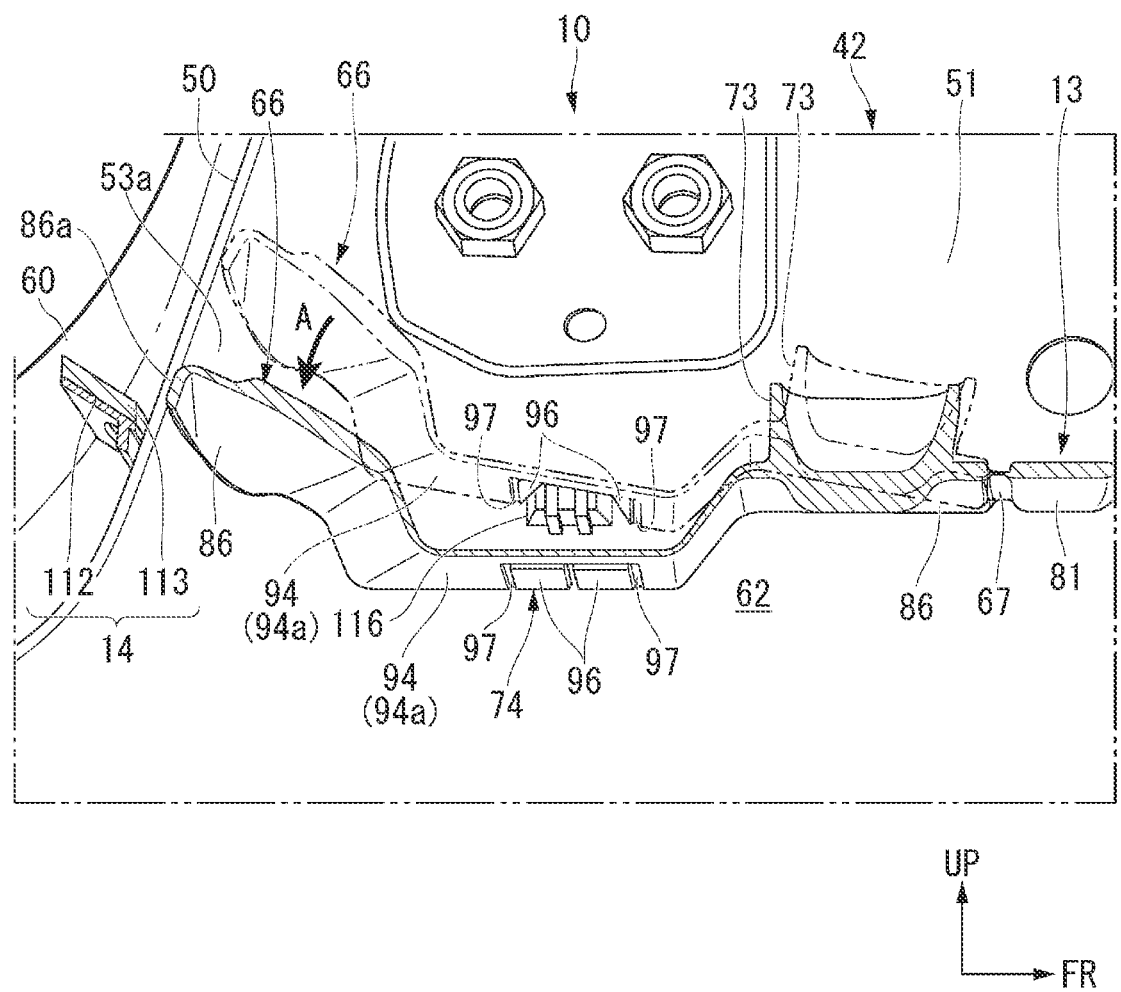
FIG. 11 is a perspective view illustrating an example in which the partitioning member of the embodiment is disposed inside a first closed cross-sectional portion.

Here, it is conceivable that as shown in FIGS. 6 and 11, in the vehicle body lateral section structure 10, for example, the sound insulation member 14 is fixed to the inside of the second closed cross-sectional portion 60 in advance with the first fixing clip 115 and the second fixing clip 116 before the partitioning member 13 is disposed inside the first closed cross-sectional portion 50. The first fixing clip 115 and the second fixing clip 116 protrude to the inside of the first closed cross-sectional portion 50 through the first attachment hole 55 and the second attachment hole 56 of the stiffener external surface portion 51.

On the other hand, the recess 94 is formed in the second partitioning portion 66 of the partitioning member 13 in order to adjust the filling amount of the filling material. The recess 94 protrudes downward. Therefore, it is conceivable that when the partitioning member 13 is attached to the inside of the first closed cross-sectional portion 50 as shown by an arrow A, the bottom portion 94a of the recess 94 interferes with, for example, the second fixing clip 116 of the sound insulation member 14 that is fixed in advance.

Therefore, the door portion 74 is formed in the recess 94 such that the door portion 74 is opened and closed to allow the second fixing clip 116 of the sound insulation member 14 to pass. Therefore, the door portion 74 can be opened when the second fixing clip 116 passes and can be closed after the second fixing clip 116 passes. As a result, the partitioning member 13 can be assembled at a normal position, and further, the sealing property of the partitioning member 13 after assembly can be ensured. Therefore, by the filling space 62 of the first closed cross-sectional portion 50 being filled with the foamable filling material through the first filling port 45 and the second filling port 46 (see FIG. 3), the first closed cross-sectional portion 50 can be reliably blocked with the filling material.

As described above, according to the vehicle body lateral section structure 10 of the embodiment, the first closed cross-sectional portion 50 is formed by the center pillar inner 41 and the center pillar stiffener 42, and the partitioning member 13 is provided inside the first closed cross-sectional portion 50 through the opening 47 of the center pillar inner 41. The filling space 62 is formed inside the first closed cross-sectional portion 50 by providing the partitioning member 13. The second closed cross-sectional portion 60 is formed by the center pillar stiffener 42 and the center pillar outer 43. That is, the vehicle body frame material is formed by the center pillar inner 41, the center pillar stiffener 42, and the center pillar outer 43, and the first closed cross-sectional portion 50 and the second closed cross-sectional portion 60 are formed in the vehicle body frame material.

Here, by the filling space 62 of the first closed cross-sectional portion 50 being filled with the foamable filling material through the first filling port 45 and the second filling port 46, the first closed cross-sectional portion 50 is blocked with the filling material. The sound insulation member 14 is provided inside the second closed cross-sectional portion 60, and the sound insulation material 113 of the sound insulation member 14 foams when heated in a drying furnace, for example, and thus the second closed cross-sectional portion 60 is blocked with the sound insulation member 14.

In this way, by blocking the first closed cross-sectional portion 50 of the vehicle body lateral section structure 10 with the filling material and blocking the second closed cross-sectional portion 60 with the sound insulation member 14, it is possible to block all the closed cross sections of the vehicle body lateral section structure 10. As a result, the soundproofing performance of the vehicle body lateral section structure 10 can be sufficiently (dramatically) improved.

The first closed cross-sectional portion 50 has a cross section (a cross-sectional area) larger than that of the second closed cross-sectional portion 60, and the filling space 62 partitioned inside the first closed cross-sectional portion 50 is filled with, for example, spray foam as the filling material for a foaming material.

By the filling space 62 having a large cross section (a cross-sectional area) being filled with spray foam as the filling material for a foaming material in this way, the first closed cross-sectional portion 50 can be easily and reliably blocked with the filling material, and the production property and the sound insulation property can be improved.

Further, the second closed cross-sectional portion 60 is formed on a side opposite to the center pillar inner 41 with respect to the first closed cross-sectional portion 50, and the sound insulation material 113 (that is, the sound insulation member 14) that foams when heated blocks the second closed cross-sectional portion 60.

Therefore, it is not necessary to fill the second closed cross-sectional portion 60 with the filling material. Further, it is not necessary to form a filling port for filling the second closed cross-sectional portion 60 with the filling material. As a result, the second closed cross-sectional portion 60 can be easily and reliably blocked with the sound insulation member 14, and the production property and the sound insulation property can be improved.

The technical scope of the present invention is not limited to the above-described embodiments, and various modifications can be made without departing from the spirit of the present invention.

For example, in the embodiment, an example in which the partitioning member 13 is divided into two of the first partitioning portion 65 and the second partitioning portion 66 has been described, but the present invention is not limited to this. As another example, the partitioning member 13 may be divided into three or more partitioning portions.

In the embodiment, an example in which the first rib 71 is provided in the first partitioning portion 65 and the second rib 76 is provided in the second partitioning portion 66 has been described, but the present invention is not limited to this. As another example, a rib may be provided on one of the first partitioning portion 65 and the second partitioning portion 66.

Further, in the embodiment, an example in which the door portion 74 is provided with the pair of flaps 96 has been described, but the present invention is not limited to this. As another example, for example, the door portion 74 may be provided with one flap.

In addition, it is possible to appropriately replace the constituent elements in the above-described embodiments with well-known constituent elements without departing from the spirit of the present invention, and the above-described modification examples may be combined as appropriate.

REFERENCE SIGNS LIST

- 10 vehicle body lateral section structure
- 13 Partitioning member
- 14 Sound insulation member
- 25 Stiffener upper surface portion (a wall portion that partitions an end portion of a first closed cross-sectional portion)
- 32, 36 First and second fixing holes (fixing holes)
- 41 Center pillar Inner (inner panel)
- 42 Center pillar stiffener (stiffener)
- 43 Center pillar outer (side outer panel)
- 45, 46 First and second filling ports (filling ports)
- 47 Opening
- 50, 60 First and second closed cross-sectional portions
- 50a Lower end portion (end portion) of first closed cross-sectional portion
- 52a Stiffener front inclined portion
- 53a Stiffener rear inclined portion
- 62 Filling space
- 65, 66 First and second partitioning portions
- 67 Bending hinge
- 71, 76 First and second ribs (bottom ribs)
- 72 Clip portion
- 73 Fixing knob portion
- 74 Door portion
- 75 Holding knob portion
- 81, 85 First and second horizontal portions (horizontal portions)
- 82, 86 First and second inclined portions (inclined portions)
- 83, 87 First and second raised portions (raised portions)
- 97 Hinge (door hinge)
- 115, 116 First and second fixing clips (fixing clips)

The invention claimed is:

1. A vehicle body lateral section structure comprising:
an inner panel that has a filling port and an opening;
a stiffener that is attached along the inner panel and forms a first closed cross-sectional portion together with the inner panel;
a partitioning member that is provided inside the first closed cross-sectional portion through the opening and partitions a filling space communicating with the filling port inside the first closed cross-sectional portion;
a foamable filling material that fills the filling space through the filling port;
a side outer panel that covers the stiffener and forms a second closed cross-sectional portion together with the stiffener; and
a sound insulation member that is provided inside the second closed cross-sectional portion and foams when heated.

2. The vehicle body lateral section structure according to claim 1, wherein the partitioning member has a door portion that opens and closes to allow a fixing clip of the sound insulation member to pass.

3. The vehicle body lateral section structure according to claim 2, wherein the door portion is supported to be openable and closable with a door hinge made of a resin.

4. The vehicle body lateral section structure according to claim 1, wherein the partitioning member has a fixing knob portion provided inside the first closed cross-sectional portion and facing the opening.

5. The vehicle body lateral section structure according to claim 1,
wherein the first closed cross-sectional portion has a pair of inclined portions facing each other, and in the pair of inclined portions, a stiffener rear inclined portion has a smaller inclination angle than a stiffener front inclined portion,
wherein the partitioning member is divided into at least two portions via a bending hinge made of a resin and has a first partitioning portion and a second partitioning portion that come into contact with the pair of inclined portions, and
wherein, in the first partitioning portion and the second partitioning portion, the partitioning portion that comes into contact with the stiffener rear inclined portion has a clip portion that is locked to a fixing hole that opens in the filling space.

6. The vehicle body lateral section structure according to claim 1, wherein the first closed cross-sectional portion has a larger cross section than the second closed cross-sectional portion, and the filling space partitioned inside is filled with a filling material which is a foaming material.

7. The vehicle body lateral section structure according to claim 6, wherein the second closed cross-sectional portion is formed on a side opposite to the inner panel with respect to the first closed cross-sectional portion and is blocked with the sound insulation member that foams when heated.

8. The vehicle body lateral section structure according to claim 5, wherein at least one of the first partitioning portion and the second partitioning portion has a horizontal portion, an inclined portion, and a raised portion straddling the horizontal portion and the inclined portion.

9. The vehicle body lateral section structure according to claim 5, wherein, in the first partitioning portion and the second partitioning portion, the partitioning portion that comes into contact with the stiffener rear inclined portion has a holding knob portion for holding a posture at a position near the filling port and facing the opening in a state where the partitioning member is provided inside the first closed cross-sectional portion.

10. The vehicle body lateral section structure according to claim 5, wherein at least one of the first partitioning portion and the second partitioning portion has a bottom rib that comes into contact with a wall portion which partitions an end portion of the first closed cross-sectional portion.

* * * * *